UNITED STATES PATENT OFFICE.

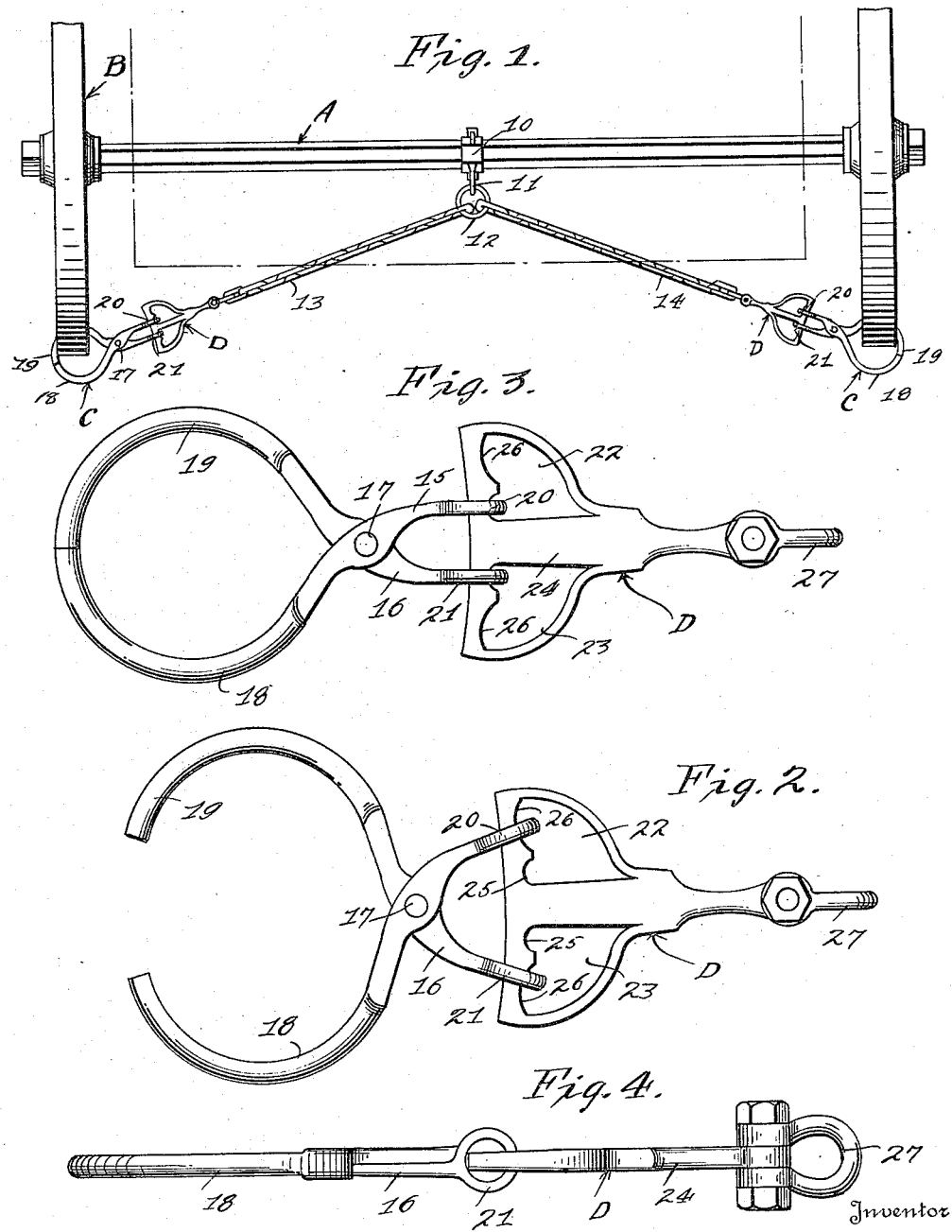

CHARLES B. STEVENS, OF NEW YORK, N. Y.

COUPLING DEVICE FOR BRAKE-CHAINS.

1,172,916.  Specification of Letters Patent.  Patented Feb. 22, 1916.

Application filed August 11, 1915. Serial No. 44,986.

*To all whom it may concern:*

Be it known that I, CHARLES B. STEVENS, a citizen of the United States, residing at New York city, in the county of New York, State of New York, have invented certain new and useful Improvements in Coupling Devices for Brake-Chains; and I do hereby declare the following to be a full, clear, and exact description of the invention, such as will enable others skilled in the art to which it appertains to make and use the same.

This invention relates to coupling devices for brake chains.

The object of the invention is to provide a coupling device of the type named whereby same may be easily secured to the rim of a wheel to hold the wheel against rotation, the coupling tendency thereof increasing as the draft on the chain increases.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of the rear axle of a wagon showing the braking chain embodying the coupling operatively applied to secure the wheels against rotation; Fig. 2, an elevation of the coupling with the parts in uncoupling position; Fig. 3, a view similar to Fig. 2 with the parts in coupling position, and Fig. 4, a side view of the coupling.

Referring to the drawings A indicates the rear axle of a wagon on which are rotatably mounted traction wheels B. Secured to the axle A is a clip 10 having an eye 11 in which is engaged a ring 12. Secured to this ring are chains 13 and 14 and secured to the free ends of these chains respectively are couplings C which are adapted to be secured to the wheels B to hold the latter against rotation. Each coupling C comprises arms 15 and 16 pivotally connected by means of a pivot pin 17. Corresponding ends of said arms are curved outwardly and inwardly as at 18 and 19 respectively, the free ends of the curved portions 18 and 19 being adapted to abut when said curved portions are moved to their limit toward each other. The ends of the arms 15 and 16 remote from the curved portions 18 and 19 are provided respectively with eye portions 20 and 21. The coupling further embodies a shank D in the form of a frame having openings 22 and 23 and a central longitudinal bar 24 dividing the frame into the openings 22 and 23. This shank is engaged through the eye portions 20 and 21 and said portions are disposed respectively on opposite sides of the bar 24. The walls of the openings 22 and 23 which are adjacent the arms 15 and 16 are provided respectively with inner recesses 25 and outer recesses 26. When the eye portions 20 and 21 are seated in the outer recesses 26 the free ends of the curved portions are separated, while on the other hand if the eye portions 20 and 21 are seated in the inner recesses 25 the free ends of the curved portions will be disposed in abutting relation. A shackle 27 is pivotally connected to the end of the shank D remote from the members 15 and 16 and to this shank the chains 13 and 14 are adapted to be secured.

What is claimed is:—

A coupling for brake chains comprising pivotally connected members having corresponding ends curved outwardly and inwardly and adapted to embrace the rim of a wheel, the remaining corresponding end of said members terminating in eye portions, a shank comprising a frame engaged through the eye portions and including a bar disposed between the eye portions, said frame being provided with recesses in which the eye portions of the coupling are adapted to seat respectively in the open and closed positions of the coupling, and a shackle pivotally secured to said frame.

In testimony whereof, I affix my signature, in the presence of two witnesses.

CHARLES B. STEVENS.

Witnesses:
H. S. SIRRER,
J. W. PIONE.

Copies of this patent may be obtained for five cents each, by addressing the "Commissioner of Patents, Washington, D. C."